United States Patent
Jiang et al.

(10) Patent No.: US 9,660,534 B2
(45) Date of Patent: May 23, 2017

(54) CONTROL CIRCUIT FOR MULTIPHASE SWITCHING CONVERTER TO REDUCE OVERSHOOT AND ASSOCIATED CONTROL METHOD

(71) Applicant: Chengdu Monolithic Power Systems Co., Ltd., Chengdu (CN)

(72) Inventors: Lijie Jiang, Hangzhou (CN); Xiaokang Wu, Hangzhou (CN); Suhua Luo, Hangzhou (CN); Qian Ouyang, Hangzhou (CN); Jinghai Zhou, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 42 days.

(21) Appl. No.: 14/667,630

(22) Filed: Mar. 24, 2015

(65) Prior Publication Data
US 2015/0270773 A1 Sep. 24, 2015

(30) Foreign Application Priority Data

Mar. 24, 2014 (CN) .......................... 2014 1 0110089

(51) Int. Cl.
*H02M 3/158* (2006.01)
*H02M 1/32* (2007.01)

(52) U.S. Cl.
CPC ........... *H02M 3/1584* (2013.01); *H02M 1/32* (2013.01); *H02M 2003/1586* (2013.01)

(58) Field of Classification Search
CPC ................. H02M 3/1584; H02M 1/32; H02M 2003/1586

USPC ......................................................... 323/234
See application file for complete search history.

(56) References Cited

U.S. PATENT DOCUMENTS

| | | | | |
|---|---|---|---|---|
| 6,703,812 | B1 * | 3/2004 | Lethellier | H02M 3/1584 323/222 |
| 6,825,642 | B2 * | 11/2004 | Brooks | H02M 3/1584 323/272 |
| 7,274,177 | B2 * | 9/2007 | Huang | H02M 1/15 323/276 |
| 7,274,181 | B2 * | 9/2007 | Schrom | H02M 3/1584 323/237 |

(Continued)

OTHER PUBLICATIONS

Search report from EIC 2800 STIC searcher John DiGeronimo.*

*Primary Examiner* — Timothy J Dole
*Assistant Examiner* — Htet Z Kyaw
(74) *Attorney, Agent, or Firm* — Perkins Coie LLP (57) ABSTRACT

A multiphase switching converter having a plurality of switching circuits and a control circuit, the plurality of switching circuits provide an output voltage, the control circuit provides a plurality of switching control signals to turn ON the plurality of switching circuits successively based on the output voltage and a reference signal, when the output voltage is detected overshooting, the control circuit turns OFF a current switching circuit, and when the output voltage is detected recovering from overshooting, the control circuit turns ON the current switching circuit again for a first time period until a sum of the first time period and a second time period achieves a predetermined value, wherein the second time period is a time period the current switching circuit maintains ON uninterruptedly before the output voltage is detected overshooting.

20 Claims, 7 Drawing Sheets

(56) References Cited

U.S. PATENT DOCUMENTS

| | | | | |
|---|---|---|---|---|
| 7,609,040 B1* | 10/2009 | Jain | ................ | H02M 3/1584 323/276 |
| 7,638,987 B2* | 12/2009 | Sugiyama | ............. | H02M 3/156 323/222 |
| 8,129,964 B2* | 3/2012 | Lish | ................ | H02M 3/1584 323/272 |
| 8,330,437 B1* | 12/2012 | Hartman | ............ | H02M 3/1588 323/222 |
| 8,427,128 B2* | 4/2013 | Tsai | ................ | H02M 3/156 323/284 |
| 8,717,002 B2 | 5/2014 | Xi | | |
| 8,896,278 B2 | 11/2014 | Ouyang | | |
| 8,922,177 B2 | 12/2014 | Ren | | |
| 2002/0125869 A1* | 9/2002 | Groom | ............... | H02M 3/1584 323/283 |
| 2006/0152205 A1* | 7/2006 | Tang | ................ | H02M 3/1584 323/284 |
| 2008/0157743 A1* | 7/2008 | Martin | ............... | H02M 3/1584 323/284 |
| 2009/0121695 A1* | 5/2009 | Pierson | .............. | H02M 3/1584 323/283 |
| 2010/0141222 A1* | 6/2010 | Ouyang | ............... | H02M 3/158 323/234 |
| 2012/0086423 A1* | 4/2012 | Dao | ................ | H02M 1/36 323/285 |
| 2012/0092900 A1* | 4/2012 | Orr | ................ | H02M 1/4208 363/21.03 |
| 2012/0146606 A1* | 6/2012 | Li | ................ | H02M 3/156 323/283 |
| 2012/0274293 A1* | 11/2012 | Ren | ................ | H02M 3/1584 323/271 |
| 2013/0002223 A1* | 1/2013 | Xi | ................ | H02M 3/158 323/284 |
| 2013/0038302 A1* | 2/2013 | Qian | ............... | H02M 3/156 323/271 |
| 2013/0285634 A1* | 10/2013 | Bianco | ............... | H02M 3/1563 323/283 |
| 2013/0307498 A1 | 11/2013 | Jiang | | |
| 2013/0308061 A1* | 11/2013 | Murakami | ......... | H02M 3/1582 348/730 |
| 2013/0342176 A1 | 12/2013 | Yang | | |
| 2014/0022684 A1 | 1/2014 | Jiang | | |
| 2014/0159689 A1* | 6/2014 | Chen | ............... | H02M 3/156 323/282 |
| 2014/0184180 A1* | 7/2014 | Kronmueller | .......... | G05F 1/595 323/271 |
| 2015/0123631 A1* | 5/2015 | Hang | ............... | H02M 1/32 323/271 |

\* cited by examiner

CONTROL CIRCUIT FOR MULTIPHASE SWITCHING CONVERTER TO REDUCE OVERSHOOT AND ASSOCIATED CONTROL METHOD

CROSS-REFERENCE TO RELATED APPLICATION(S)

This application claims the benefit of CN application No. 201410110089.7, filed on Mar. 24, 2014, and incorporated herein by reference.

TECHNICAL FIELD

The present invention relates to electrical circuit, more particularly but not exclusively relates to switching converter.

BACKGROUND

With development of high performance CPU (Central Processing Unit), switching converter with low output voltage and high output current is needed, and other good performances such as heat performance, EMI performance and fast transient response are also needed. Multiphase switching converter having a plurality of switching circuits is widely used to power high performance CPU. Constant ON-time control is widely employed in switching converter per fast transient response, simple circuit structure and smooth mode transition. A constant ON-time control circuit for controlling a multiphase switching converter usually provides a comparison signal by comparing an output voltage of the multiphase switching converter with a reference signal, and a plurality of switching circuits of the multiphase switching converter are controlled based on the comparison signal. For example, when the output voltage is smaller than the reference signal, the comparison signal becomes high voltage level and a corresponding switching circuit is turned ON. However, for a constant ON-time controlled multiphase switching converter, the output voltage will overshoot during a fast load step-down transient process.

SUMMARY

It is one of the objects of the present invention to provide a multiphase switching converter, a control circuit and associated control method for the multiphase switching converter to reduce overshoot of an output voltage.

One embodiment of the present invention discloses a control circuit for a multiphase switching converter, the multiphase switching converter having a plurality of switching circuits and an output terminal configured to provide an output voltage, the control circuit comprising: a first comparison circuit, configured to provide a comparison signal based on a reference signal and the output voltage; an overshoot control circuit, configured to provide an overshoot control signal based on the output voltage and an overshoot threshold, wherein the overshoot threshold is larger than the reference signal; and a switching control circuit, configured to provide a plurality of switching control signals based on the comparison signal and the overshoot control signal, wherein the switching control circuit is configured to turn ON the plurality of switching circuits successively based on the comparison signal; wherein when the overshoot control signal indicates that the output voltage is overshooting, the switching control circuit is configured to turn OFF a current switching circuit; and wherein when the overshoot control signal indicates that the output voltage recovers from overshooting, the switching control circuit is configured to turn ON the current switching circuit again for a first time period, wherein a sum of the first time period and a second time period equals a predetermined value, the second time period is a time period that the current switching circuit maintains ON uninterruptedly before the output voltage is detected overshooting.

Another embodiment of the present invention discloses a multiphase switching converter, comprising: a plurality of switching circuits, configured to provide an output voltage; and a control circuit, configured to provide a plurality of switching control signals to turn ON the plurality of switching circuits successively based on the output voltage and a reference signal; wherein when the output voltage is detected overshooting, the control circuit is configured to turn OFF a current switching circuit, and when the output voltage is detected recovering from overshooting, the control circuit is configured to turn ON the current switching circuit again for a first time period until a sum of the first time period and a second time period achieves a predetermined value, wherein the second time period is a time period the current switching circuit maintains ON uninterruptedly before the output voltage is detected overshooting.

Yet another embodiment of the present invention discloses a method for controlling a multiphase switching converter, wherein the multiphase switching converter having a plurality of switching circuits and an output terminal configured to provide an output voltage, and the method comprising: providing a comparison signal based on a reference signal and the output voltage; judging if the output voltage is overshooting based on the output voltage and an overshoot threshold; distributing the comparison signal to a plurality of set signals to turn ON the plurality of switching circuits successively; and turning OFF a current switching circuit when an ON-time period of the current switching circuit achieves a predetermined value; wherein when the output voltage is judged overshooting, the current switching circuit is turned OFF temporarily, and when the output voltage is judged recovering from overshooting, the current switching circuit is turned ON again for a first time period.

BRIEF DESCRIPTION OF THE DRAWINGS

Non-limiting and non-exhaustive embodiments are described with reference to the following drawings.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to multiphase switching converter, control circuit and associated control method. As used hereinafter, the term "couple" generally refers to multiple ways including a direct connection with an electrical conductor and an indirect connection through intermediate diodes, resistors, capacitors, and/or other intermediaries.

Figure 1:
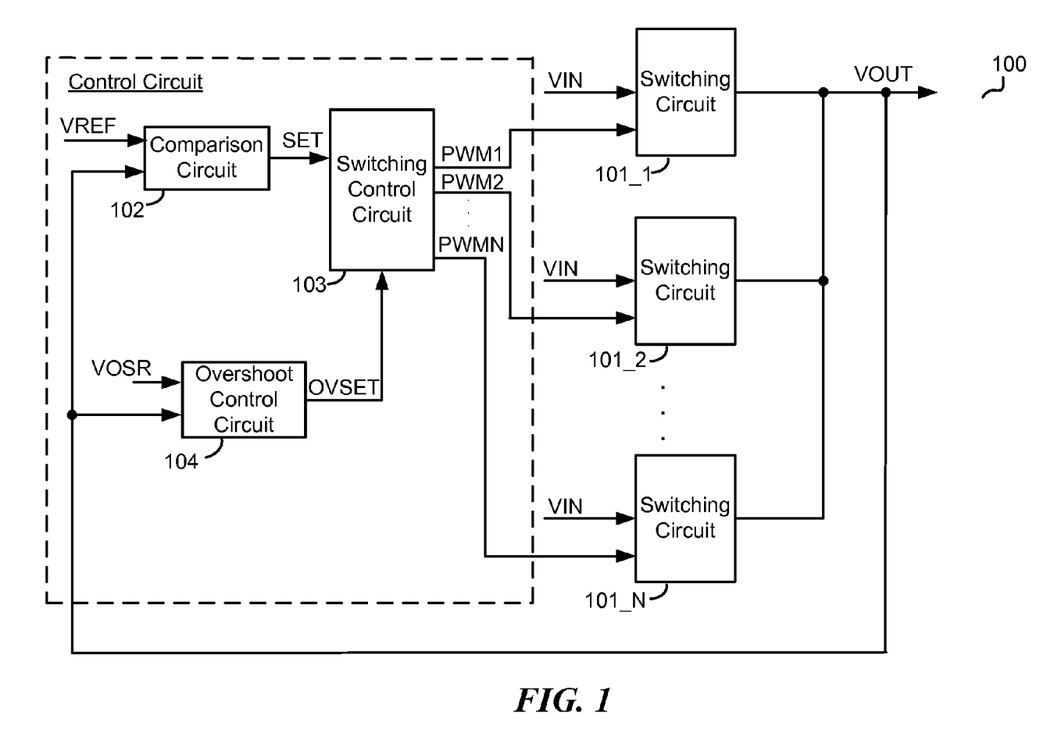
FIG. 1 illustrates a multiphase switching converter 100 according to an embodiment of the present invention.

FIG. 1 illustrates a multiphase switching converter 100 according to an embodiment of the present invention. Multiphase switching converter 100 comprises a control circuit (as shown in a dashed frame) and switching circuits 101_1-101_N, where N is an integer larger than 1. An input terminal of each switching circuits 101_1-101_N is configured to receive input voltage VIN, and an output terminal of each switching circuits 101_1-101_N is coupled together as an output terminal of multiphase switching circuit 100 to provide output voltage VOUT. Switching circuits 101_1-101_N may adopt any suitable DC/DC or AC/DC topology, such as step-up converter, step-down converter, flyback converter, and so on. The control circuit is configured to provide switching control signals PWM1-PWMN to turn ON switching circuits 101_1-101_N successively.

The control circuit comprises a comparison circuit 102, a switching control circuit 103 and an overshoot control circuit 104. Comparison circuit 102 is coupled to the output terminal of multiphase switching converter 100 to receive output voltage VOUT, and is configured to provide a comparison signal SET based on a reference signal VREF and output voltage VOUT. Overshoot control circuit 104 is coupled to the output terminal of multiphase switching converter 100 to receive output voltage VOUT, and is configured to provide an overshoot control signal OVSET to indicate if output voltage VOUT is overshooting. In one embodiment, overshoot control circuit 104 is configured to judge if output voltage VOUT is overshooting by comparing output voltage VOUT with an overshoot threshold VOSR. In another embodiment, overshoot control circuit 104 may be configured to judge if output voltage VOUT is overshooting by comparing a feedback signal indicative of output voltage VOUT with overshoot threshold VOSR. Switching control circuit 103 is coupled to comparison circuit 102 to receive comparison signal SET, and coupled to overshoot control circuit 104 to receive overshoot control signal OVSET, and is configured to provide switching control signals PWM1-PWMN to control the switching circuits 101_1-101_N based on comparison signal SET and overshoot control signal OVSET.

In one embodiment, multiphase switching converter 100 may comprise a feedback circuit coupled to the output terminal of multiphase switching converter 100 to receive output voltage VOUT, the feedback circuit provides the feedback signal indicative of output voltage VOUT. In one embodiment, a slope compensation circuit configured to provide a slope compensation signal may be employed to avoid sub-harmonic oscillation. The slope compensation signal may be added to output voltage VOUT or the feedback signal indicative of output voltage VOUT, or be subtracted from reference signal VREF.

In one embodiment, when output voltage VOUT is detected overshooting, switching control circuit 103 is configured to turn OFF a current switching circuit temporarily, wherein the current switching circuit is one of switching circuits 101_1-101_N which is turned ON; and when output voltage VOUT is detected recovering from overshooting, switching control circuit 103 is configured to turn ON the current switching circuit again for a first time period until a sum of the first time period and a second time period equals a predetermined value TON, where the second time period is a time period that the current switching circuit maintains ON uninterruptedly before output voltage VOUT is detected overshooting. As a result, overshoot of output voltage VOUT is reduced and transient response is improved, meanwhile a current flowing through each of switching circuits 101_1-101_N equals each other to achieve current balance.

Figure 2:
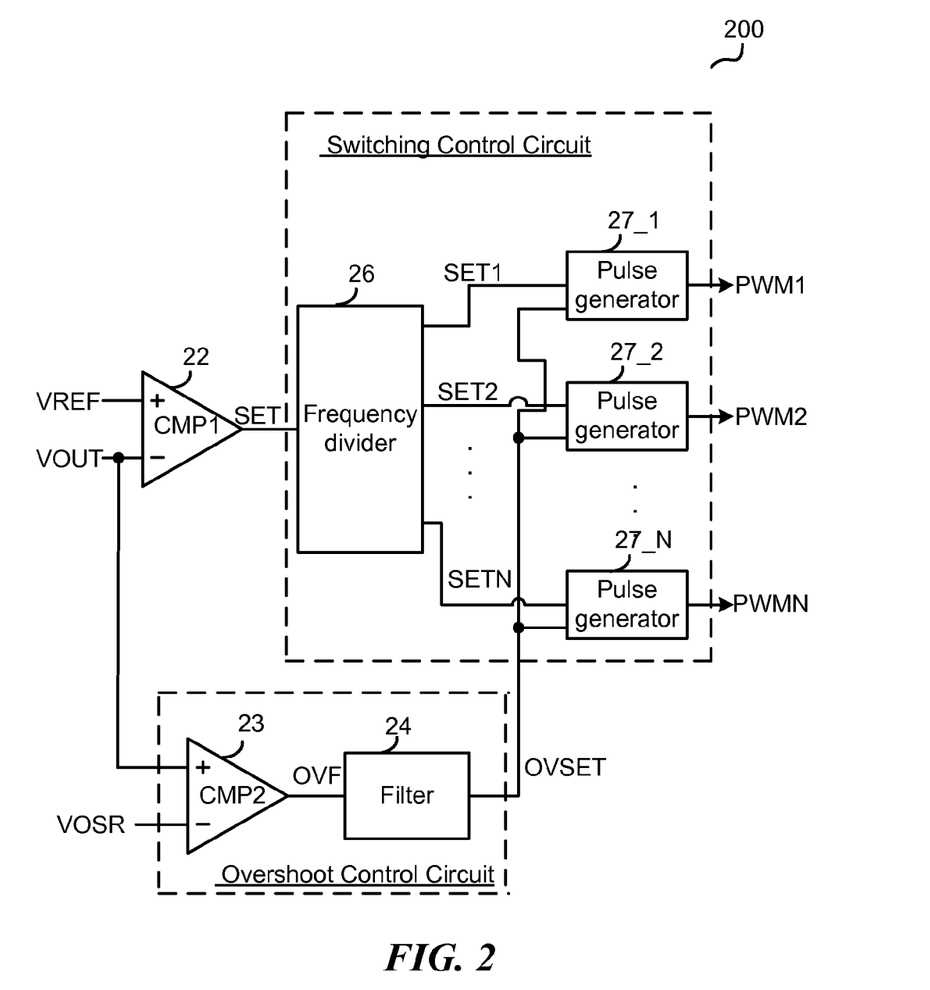
FIG. 2 schematically illustrates a control circuit 200 according to an embodiment of the present invention.

FIG. 2 schematically illustrates a control circuit 200 according to an embodiment of the present invention. Control circuit 200 comprises a comparison circuit 22, an over shoot control circuit and a switching control circuit.

Comparison circuit 22 comprises a comparator CMP1. An inverting terminal of comparator CMP1 is configured to receive output voltage VOUT, a non-inverting terminal of comparator CMP1 is configured to receive reference signal VREF, and an output terminal of comparator CMP1 is configured to provide comparison signal SET via comparing output voltage VOUT with reference signal VREF. In another embodiment, comparator CMP1 is configured to receive the feedback signal indicative of output voltage VOUT at its inverting terminal, and provide comparison signal SET via comparing the feedback signal with reference signal VREF.

The overshoot control circuit comprises a comparison circuit 23 and a filter 24. As shown in FIG. 2, comparison circuit 23 comprises a comparator CMP2. An inverting terminal of comparator CMP2 is configured to receive overshoot threshold VOSR, a non-inverting terminal of comparator CMP2 is configured to receive output voltage VOUT, and an output terminal of comparator CMP2 is configured to provide overshoot indicating signal OVF. Filter 24 is coupled to the output terminal of comparator CMP2 to receive overshoot indicating signal OVF, and is configured to provide overshoot control signal OVSET based on overshoot indicating signal OVF. Filter 24 is employed to reduce or eliminate oscillation of overshoot control signal OVSET, as a result, oscillation of output voltage VOUT at overshoot threshold VOSR is reduced to improve stability, a time period during which output voltage VOUT decreases from overshoot threshold VOSR to a target value is reduced. In one embodiment, the target value equals reference signal VREF. In one embodiment, the overshoot control circuit may also comprise a hysteresis comparator to avoid oscillation of output voltage VOUT at overshoot threshold VOSR.

The switching control circuit comprises a frequency divider 26 and pulse generators 27_1-27_N. Frequency divider 26 is coupled to the output terminal of comparison circuit 22 to receive comparison signal SET, and provides set signals SET1-SETN based on comparison signal SET.

Frequency divider 26 is configured to distribute comparison signal SET to set signals SET1-SETN to turn ON switching circuits 101_1-101_N successively. In one embodiment, when output voltage VOUT is smaller than reference signal VREF, comparison signal SET is high voltage level, and frequency divider 26 is configured to distribute high voltage level comparison signal SET to one of set signals SET1-SETN to turn on a corresponding switching circuit. Pulse generator 27_i is configured to receive a set signal SETi and overshoot control signal OVSET, and is configured to provide a switching control signal PWMi to a switching circuit 101_i based on set signal SETi, overshoot control signal OVSET and an ON-time control signal COT, where i=1, . . . , N. Pulse generator 27_i is configured to turn ON switching circuit 101_i based on set signal SETi and overshoot control signal OVSET, and turn OFF switching circuit 101_i based on overshoot control signal OVSET and ON-time control signal COT, wherein ON-time control signal COT is configured to control an ON-time period of switching circuit 101_i.

In one embodiment, when set signal SETi becomes high voltage level, pulse generator 27_i provides switching control signal PWMi to turn ON switching circuit 101_i, and when the ON-time period of switching circuit 101_i equals a predetermined value TON, pulse generator 27_i is configured to turn OFF switching circuit 101_i by switching control signal PWMi. When overshoot control signal OVSET indicates that output voltage VOUT is overshooting during switching circuit 101_i is turned ON, pulse generator 27_i is configured to turn OFF switching circuit 101_i temporarily, and when overshoot control signal OVSET indicates that output voltage VOUT recovers, pulse generator 27_i is configured to turn ON switching circuit 101_i again. A sum of an ON-time period of switching circuit 101_i before output voltage VOUT is detected overshooting and an ON-time period of switching circuit 101_i after output voltage VOUT is detected recovering from overshooting equals predetermined value TON. In one embodiment, predetermined value TON is constant. In another embodiment, predetermined value TON is adjusted with input voltage VIN and/or output voltage VOUT.

Figure 3:
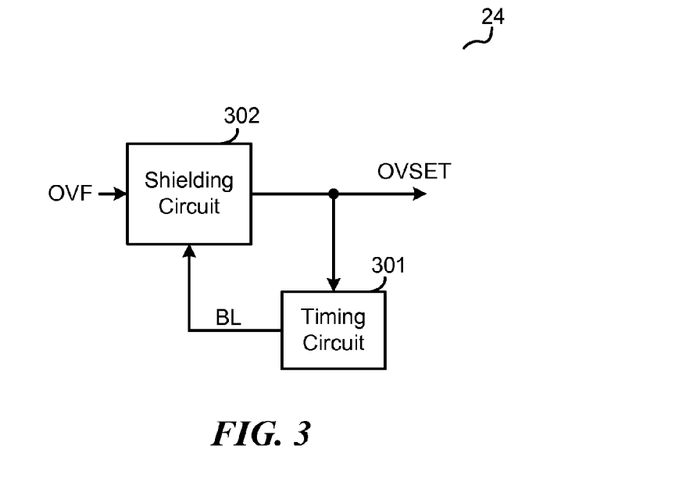
FIG. 3 schematically illustrates a filter 24 shown in FIG. 2 according to an embodiment of the present invention.

FIG. 3 schematically illustrates a filter 24 shown in FIG. 2 according to an embodiment of the present invention. Filter 24 comprises a timing circuit 301 and a shielding circuit 302. Timing circuit 301 is configured to provide shielding signal BL based on overshoot control signal OVSET. Shielding circuit 302 has an input terminal configured to receive overshoot indicating signal OVF, a control terminal coupled to timing circuit 301 to receive shielding signal BL, and an output terminal configured to provide overshoot control signal OVSET based on overshoot indicating signal OVF and shielding signal BL. In one embodiment, when overshoot control signal OVSET becomes low voltage level to indicate that output voltage VOUT recovers from overshooting, timing circuit 301 starts timing, shielding signal BL becomes high voltage to shield overshoot indicating signal OVF, and overshoot control signal OVSET maintains at low voltage level. When a time period timed by timing circuit 301 achieves a predetermined time period BLTIME, timing circuit 301 stops timing, shielding signal BL becomes low voltage level, and shielding circuit 302 is configured to provide overshoot control signal OVSET based on overshoot indicating signal OVF. Timing circuit 301 may comprise a counter, a timer or any other suitable circuit for timing.

Figure 4:
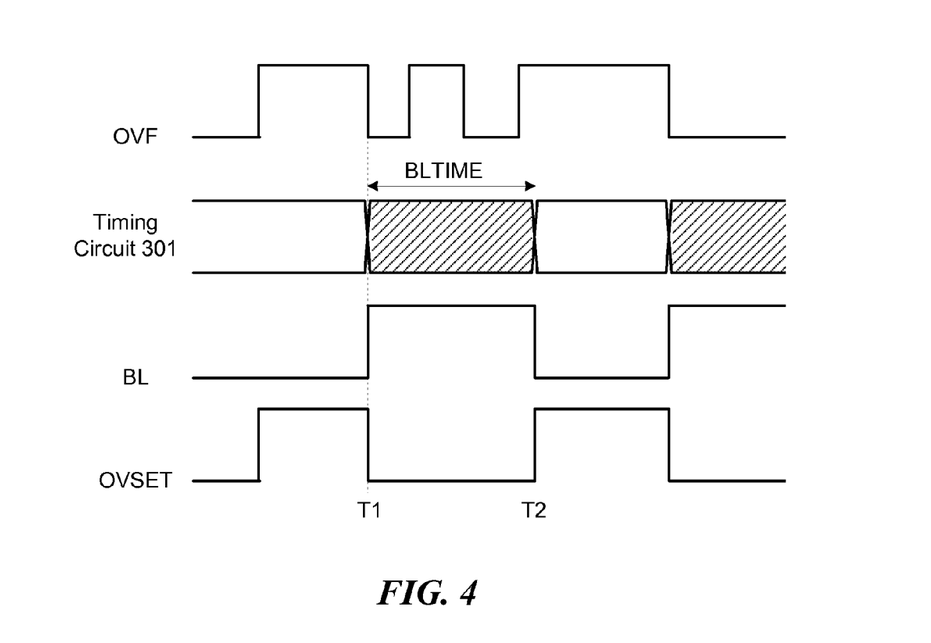
FIG. 4 shows waveforms of filter 24 shown in FIG. 3 according to an embodiment of the present invention.

FIG. 4 shows waveforms of filter 24 shown in FIG. 3 according to an embodiment of the present invention. As shown in FIG. 4, at time T1, overshoot indicating signal OVF becomes low voltage level, and overshoot control signal OVSET becomes low voltage level to indicate that output voltage VOUT recovers from overshooting, shielding signal BL becomes high voltage level to shield overshoot indicating signal OVF, then overshoot control signal OVSET maintains at low voltage level during predetermined time period BLTIME. At time T2, the time period timed by timing circuit 301 achieves predetermined time period BLTIME, shielding signal BL becomes low voltage level, and overshoot control signal OVSET changes with overshoot indicating signal OVF, e.g., overshoot control signal OVSET becomes high voltage level per overshoot indicating signal OVF becomes high voltage level.

Figure 5:
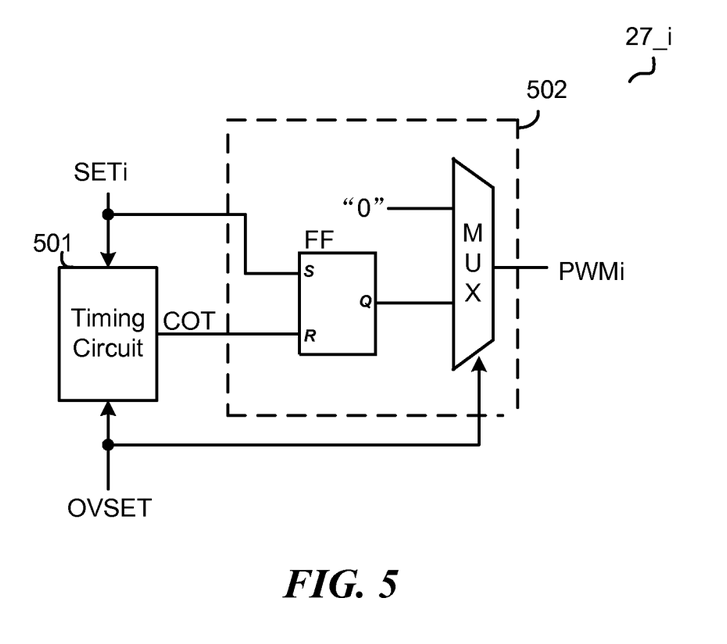
FIG. 5 schematically illustrates a pulse generator 27_i shown in FIG. 2 according to an embodiment of the present invention.

FIG. 5 schematically illustrates a pulse generator 27_i shown in FIG. 2 according to an embodiment of the present invention. Pulse generator 27_i comprises a timing circuit 501 and an output circuit 502.

Timing circuit 501 is configured to provide ON-time control signal COT based on set signal SETi and overshoot control signal OVSET. In one embodiment, timing circuit 501 starts timing when set signal SETi is high voltage level, timing circuit 501 pauses when overshoot control signal OVSET indicates that output voltage VOUT is overshooting, and timing circuit 501 stops timing and provide a high voltage level ON-time control signal COT when a time period timed by timing circuit 501 achieves predetermined value TON. Timing circuit 501 may comprise a counter, a timer and any other suitable circuit for timing.

Output circuit 502 is coupled to timing circuit 501, and is configured to provide switching control signal PWMi based on ON-time control signal COT, set signal SETi and overshoot control signal OVSET. When set signal SETi is high voltage level, switching circuit 101_i is turned ON by switching control signal PWMi, and when ON-time control signal COT is high voltage level, switching circuit 101_i is turned OFF by switching control signal PWMi. If overshoot control signal OVSET becomes high voltage level during when switching circuit 101_i is turned ON, then switching control signal PWMi is configured to turn OFF switching circuit 101_i temporarily, and when overshoot control signal OVSET becomes low voltage level, switching control signal PWMi is configured to turn ON switching circuit 101_i again.

In one embodiment, output circuit 502 comprises a flip-flop FF and a multiplexer MUX. Flip-flop FF comprises a set terminal S, a reset terminal R and an output terminal Q, where set terminal S is configured to receive set signal SETi, reset terminal R is coupled to timing circuit 501 to receive ON-time control signal COT. When set signal SETi is high voltage level, flip-flop FF is set to provide a high voltage level signal at output terminal Q, and when ON-time control signal COT becomes high voltage level, flip-flop FF is reset to provide a low voltage level signal at output terminal Q. Multiplexer MUX has a first input terminal, a second input terminal, a control terminal and an output terminal, wherein the first input terminal is coupled to a fixed voltage, e.g., low voltage level ("0"), the second input terminal is coupled to output terminal Q of flip-flop FF, the control terminal is configured to receive overshoot control signal OVSET, and the output terminal is configured to provide switching control signal PWMi. When overshoot control signal OVSET is high voltage level, multiplexer MUX is configured to provide switching control signal PWMi to turn OFF switching circuit 101_i, and when overshoot control signal OVSET is low voltage level, multiplexer MUX is configured to provide switching control signal PWMi to turn ON and turn OFF switching circuit 101_i based on the signal at output terminal Q of flip-flop FF.

In one embodiment, the control circuit shown in FIGS. 1-5 may be implemented by a digital circuit, such as FPGA (Field Programmable Gate Array), DSP (Digital Signal Processor), ASIC (Application Specific Integrated Circuit) and so on.

Figure 6:
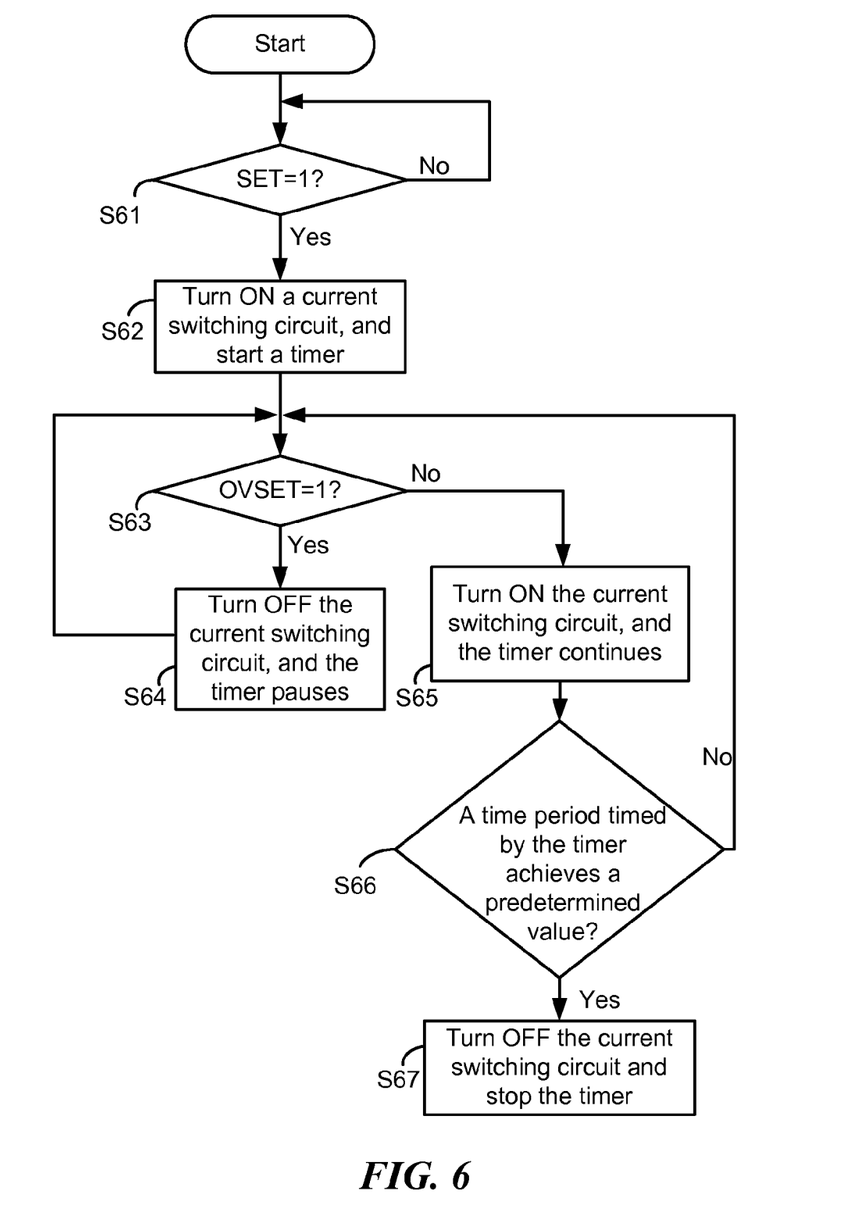
FIG. 6 shows a flow chart illustrating a control method for control circuit 200 according to an embodiment of the present invention.

FIG. 6 shows a flow chart illustrating a control method for control circuit 200 according to an embodiment of the present invention. The control method comprises steps S61-S67.

At step S61, judging if comparison signal SET is high voltage level (SET=1), if yes then go to step S62, otherwise return to step S61.

At step S62, turning ON a current switching circuit, and staring a timer.

At step S63, judging if overshoot control signal OVSET is high voltage level (OVSET=1), if yes then go to step S64, otherwise go to step S65.

At step S64, turning OFF the current switching circuit temporarily, and the timer pauses. Then go back to step S63.

At step S65, turning ON the current switching circuit, and the timer continues.

At step S66, judging if a time period timed by the timer achieves a predetermined value TON, if yes then go to step S67, otherwise go back to step S63.

At step S67, turning OFF the current switching circuit, and stopping the timer.

Figure 7:
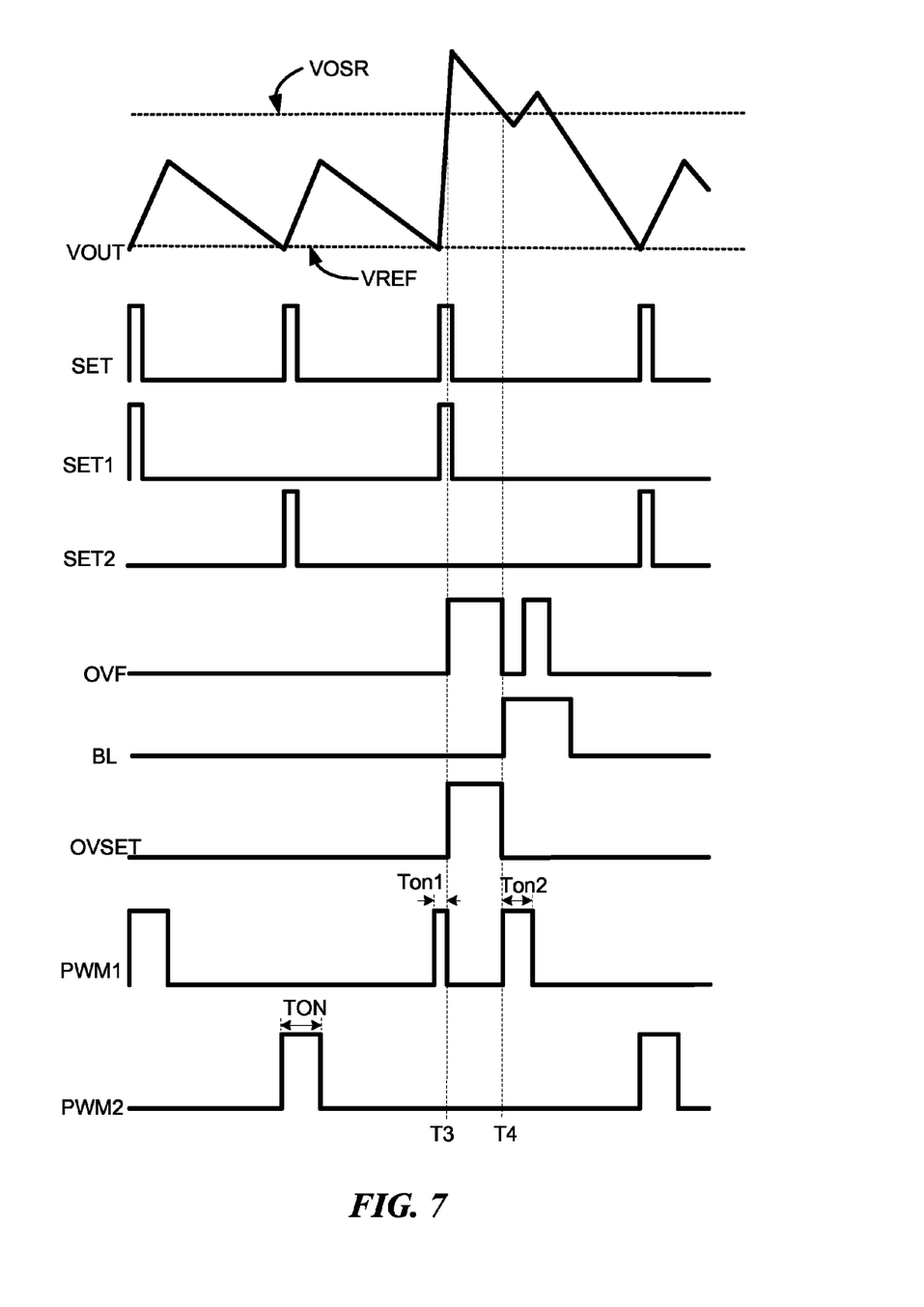
FIG. 7 shows waveforms of multiphase switching converter 100 shown in FIG. 1 according to an embodiment of the present invention.

FIG. 7 shows waveforms of multiphase switching converter 100 shown in FIG. 1 according to an embodiment of the present invention. Embodiment shown in FIG. 7 takes dual-phase switching converter as one example, i.e., N=2. When output voltage VOUT is smaller than reference signal VREF, comparison signal SET becomes high voltage level, and comparison signal SET is distributed to set signals SET1 and SET2 to turn ON switching circuits 101_1 and 101_2 successively. When output voltage VOUT is larger than overshoot threshold VOSR, overshoot indicating signal OVF becomes high voltage level. When shielding signal BL becomes high voltage level, overshoot indicating signal OVF is shielded, and overshoot control signal OVSET maintains. Otherwise when shielding signal BL is low voltage level, overshoot control signal OVSET changes with overshoot indicating signal OVF. When set signal SET1 is high voltage level, switching control signal PWM1 becomes high voltage level to turn ON switching circuit 101_1 until an ON-time period of switching circuit 101_1 achieves predetermined value TON, and when set signal SET2 is high voltage level, switching control signal PWM2 becomes high voltage level to turn ON switching circuit 101_2 until an ON-time period of switching circuit 1012 achieves predetermined value TON. As shown in FIG. 7, before time T3, switching control signal PWM1 is high voltage level and switching circuit 101_1 maintains ON for a time period Ton1, and at time T3, overshoot control signal OVSET is high voltage level to indicate that output voltage VOUT is overshooting, switching control signal PWM1 becomes low voltage level to turn OFF switching circuit 101_1 temporarily. At time T4, overshoot control signal OVSET is low voltage level to indicate that output voltage VOUT recovers from overshooting, switching control signal PWM1 becomes high voltage level to turn ON switching circuit 101_1 again for a time period Ton2, wherein a sum of time period Ton1 and time period Ton2 equals predetermined value TON.

It is noted that the logics of "high voltage level" or "low voltage level" for signals may be in alternative levels since different logic levels may lead to a same result. For example, when overshoot control signal OVSET indicates that output voltage VOUT is overshooting, the current switching circuit is turned OFF by a corresponding switching control signal no matter the overshoot control signal OVSET or the corresponding switching control signal is high voltage level or low voltage level.

Figure 8:
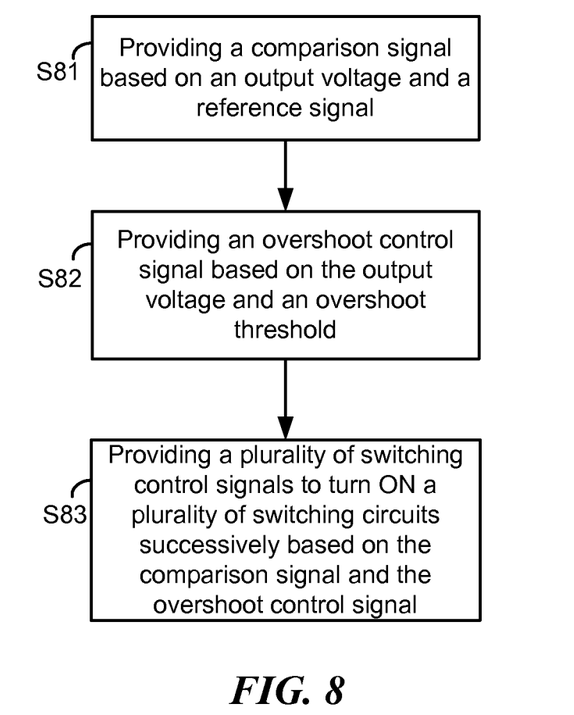
FIG. 8 shows a flow chart illustrating a control method for a multiphase switching converter according to an embodiment of the present invention.

FIG. 8 shows a flow chart illustrating a control method for a multiphase switching converter according to an embodiment of the present invention. The multiphase switching converter has a plurality of switching circuits and an output terminal configured to provide an output voltage. The control method comprises steps S81-S83.

At step S81, providing a comparison signal based on an output voltage and a reference signal.

At step S82, providing an overshoot control signal based on the output voltage and an overshoot threshold.

At step S83, providing a plurality of switching control signals based on the comparison signal and the overshoot control signal to turn ON the plurality of switching circuits successively.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A control circuit for a multiphase switching converter, the multiphase switching converter having a plurality of switching circuits and an output terminal configured to provide an output voltage, the control circuit comprising:
    a first comparison circuit configured to provide a comparison signal based on a reference signal and the output voltage;
    an overshoot control circuit configured to provide an overshoot control signal based on the output voltage and an overshoot threshold, wherein the overshoot threshold is larger than the reference signal; and
    a switching control circuit configured to provide a plurality of switching control signals to control the plurality of switching circuits based on the comparison signal and the overshoot control signal, wherein the switching control circuit is configured to turn ON the plurality of switching circuits successively based on the comparison signal; wherein
    when the overshoot control signal indicates that the output voltage is overshooting, the switching control circuit is configured to turn OFF a current switching circuit; and wherein
    when the overshoot control signal indicates that the output voltage recovers from overshooting, the switching control circuit is configured to turn ON the current switching circuit again for a first time period, wherein a sum of the first time period and a second time period equals a predetermined value, and wherein the second time period is a time period that the current switching circuit maintains ON uninterruptedly before the output voltage is detected overshooting.

2. The control circuit of claim 1, wherein the switching control circuit further comprises:
    a frequency divider having an input terminal and a plurality of output terminals, wherein the input terminal is coupled to the first comparison circuit to receive the comparison signal, and the plurality of output terminals are configured to provide a plurality of set signals based on the comparison signal, and wherein the frequency divider is configured to distribute the comparison signal to the plurality of set signals to turn ON the plurality of switching circuits successively; and a plurality of pulse generators, each pulse generator having a first input terminal, a second input terminal and an output terminal, wherein the first input terminal is coupled to the frequency divider to receive a set signal, the second input terminal is coupled to the overshoot control circuit to receive the overshoot control signal, and the output terminal is configured to provide a switching control signal based on the set signal, the overshoot control circuit and an ON-time control signal.

3. The control circuit of claim 2, wherein each pulse generator is configured to turn ON a corresponding switching circuit based on the set signal and the overshoot control signal, and is configured to turn OFF the corresponding switching circuit based on the ON-time control signal and the overshoot control signal, wherein the ON-time control signal is configured to control an ON-time period of the corresponding switching circuit.

4. The control circuit of claim 2, wherein each pulse generator further comprises:
a first timing circuit configured to provide the ON-time control signal based on the set signal and the overshoot control signal, wherein the first timing circuit starts timing based on the set signal, the first timing circuit pauses based on the overshoot control signal, and the first timing circuit stops timing and provides the ON-time control signal to turn OFF a corresponding switching circuit when a time period timed by the first timing circuit achieves the predetermined value; and
an output circuit configured to provide the switching control signal based on the ON-time control signal, the set signal and the overshoot control signal, wherein the switching control signal is configured to turn ON the corresponding switching circuit based on the set signal and turn OFF the corresponding switching circuit based on the ON-time control signal, and wherein the switching control signal is configured to turn OFF the corresponding switching circuit temporarily based on the overshoot control signal.

5. The control circuit of claim 2, wherein each pulse generator further comprises:
a first timing circuit having a first input terminal, a second input terminal and an output terminal, wherein the first input terminal is coupled to one of the plurality of output terminals of the frequency divider to receive the set signal, the second input terminal is coupled to the overshoot control circuit to receive the overshoot control signal, and the output terminal is configured to provide the ON-time control signal based on the set signal and the overshoot control signal, wherein the first timing circuit starts timing based on the set signal, and the first timing circuit pauses based on the overshoot control signal, and wherein a corresponding switching circuit is turned OFF based on the ON-time control signal when a time period timed by the first timing circuit equals the predetermined value;
a flip-flop having a set terminal, a reset terminal and an output terminal, wherein the set terminal is coupled to one of the plurality of output terminals of the frequency divider to receive the set signal, the reset terminal is coupled to the output terminal of the first timing circuit to receive the ON-time control signal, and the output terminal is configured to provide a control signal; and
a multiplexer having a first input terminal, a second input terminal, a control terminal and an output terminal, wherein the first input terminal is coupled to a fixed voltage level, the second input terminal is coupled to the output terminal of the flip-flop to receive the control signal, the control terminal is coupled to the overshoot control circuit to receive the overshoot control signal, and the output terminal is configured to provide the switching control signal based on the fixed voltage level, the control signal, and the overshoot control signal.

6. The control circuit of claim 1, wherein the overshoot control circuit further comprises:
a second comparison circuit having a first input terminal, a second input terminal and an output terminal, wherein the first input terminal is coupled to the output terminal of the multiphase switching circuit, the second input terminal is configured to receive the overshoot threshold, the output terminal is configured to provide an overshoot indicating signal based on the output voltage and the overshoot threshold; and
a filter having an input terminal and an output terminal, wherein the input terminal is coupled to the output terminal of the second comparison circuit to receive the overshoot indicating signal, and the output terminal is configured to provide the overshoot control signal based on the overshoot indicating signal.

7. The control circuit of claim 6, wherein when the overshoot control signal becomes a first state, the filter is configured to shield the overshoot indicating signal during a predetermined time period.

8. The control circuit of claim 6, wherein the filter further comprises:
a second timing circuit having an input terminal and an output terminal, wherein the input terminal is configured to receive the overshoot control signal, and the output terminal is configured to provide a shielding signal based on the overshoot control signal; and
a shielding circuit having an input terminal, a control terminal and an output terminal, wherein the input terminal is coupled to the output terminal of the second comparison circuit to receive the overshoot indicating signal, the control terminal is coupled to the output terminal of the second timing circuit to receive the shielding signal, and the output terminal is configured to provide the overshoot control signal based on the shielding signal and the overshoot indicating signal.

9. The control circuit of claim 6, wherein when the overshoot control signal becomes a first state, a second timing circuit starts timing, the overshoot indicating signal is shielded and the overshoot control signal maintains, when a time period timed by the second timing circuit achieves a predetermined time period, the second timing circuit stops timing, and the overshoot control signal changes with the overshoot indicating signal.

10. A multiphase switching converter, comprising:
a plurality of switching circuits configured to provide an output voltage; and
a control circuit configured to provide a plurality of switching control signals to turn ON the plurality of switching circuits successively based on the output voltage and a reference signal; wherein
when the output voltage is detected overshooting, the control circuit is configured to turn OFF a current switching circuit, and when the output voltage is detected recovering from overshooting, the control circuit is configured to turn ON the current switching circuit again for a first time period until a sum of the first time period and a second time period achieves a predetermined value, wherein the second time period is a time period the current switching circuit maintains ON uninterruptedly before the output voltage is detected overshooting.

11. The multiphase switching converter of claim 10, wherein the control circuit further comprises:
   a first comparison circuit configured to provide a comparison signal based on the reference signal and the output voltage;
   an overshoot control circuit configured to provide an overshoot control signal based on the output voltage and an overshoot threshold, wherein the overshoot threshold is larger than the reference signal;
   a frequency divider configured to provide a plurality of set signals based on the comparison signal, wherein the frequency divider is configured to distribute the comparison signal to the plurality of set signals to turn ON the plurality of switching circuits successively; and
   a plurality of pulse generators, each pulse generator is configured to provide a switching control signal to a corresponding switching circuit based on a set signal and the overshoot control signal.

12. The multiphase switching converter of claim 11, wherein the switching control signal is configured to turn ON the corresponding switching circuit based on the set signal, and wherein when the overshoot control signal indicates that the output voltage is overshooting, the switching control signal is configured to turn OFF the corresponding switching circuit temporarily, and when the overshoot control signal indicates that the output voltage recovers, the switching control signal is configured to turn ON the corresponding switching circuit again.

13. The multiphase switching converter of claim 11, wherein each pulse generator further comprises:
   a first timing circuit configured to provide an ON-time control signal based on the set signal and the overshoot control signal, wherein the first timing circuit starts timing based on the set signal, the first timing circuit pauses based on the overshoot control signal, and the first timing circuit stops timing and provides the ON-time control signal to turn OFF the corresponding switching circuit when a time period timed by the first timing circuit achieves the predetermined value; and
   an output circuit configured to provide the switching control signal based on the ON-time control signal, the set signal and the overshoot control signal, wherein the switching control signal is configured to turn ON the corresponding switching circuit based on the set signal and turn OFF the corresponding switching circuit based on the ON-time control signal, and wherein the switching control signal is configured to turn OFF the corresponding switching circuit temporarily based on the overshoot control signal.

14. The multiphase switching converter of claim 13, wherein the output circuit further comprises:
   a flip-flop configured to provide a control signal based on the ON-time control signal and the set signal, wherein the flip-flop is set based on the set signal, and the flip-flop is reset based on the ON-time control signal; and
   a multiplexer configured to provide the switching control signal based on the control signal and the overshoot control signal, wherein when the overshoot control signal indicates that the output voltage is overshooting, the switching control signal is configured to turn OFF the corresponding switching circuit, otherwise the switching control signal is configured to turn ON and turn OFF the corresponding switching circuit based on the control signal.

15. The multiphase switching converter of claim 11, wherein the overshoot control circuit further comprises:
   a second comparison circuit configured to provide an overshoot indicating signal based on the output voltage and the overshoot threshold;
   a second timing circuit configured to provide a shielding signal based on the overshoot control signal; and
   a shielding circuit configured to providing an overshoot control signal based on the overshoot indicating signal and the shielding signal; wherein
   when the overshoot control signal becomes a first state, the second timing circuit starts timing, and the overshoot indicating signal is shielded; and wherein
   when a time period timed by the second timing circuit achieves a predetermined time period, the second timing circuit stops timing, and the shielding circuit is configured to provide the overshoot control signal based on the overshoot indicating signal.

16. The multiphase switching converter of claim 10, wherein the control circuit further comprises:
   a second comparison circuit configured to provide an overshoot indicating signal based on the output voltage and the overshoot threshold; and
   a filter configured to provide an overshoot control signal based on the overshoot indicating signal to indicate if the output voltage is detected overshooting, wherein the overshoot indicating signal is shielded and the overshoot control signal maintains during a predetermined time period after the output voltage is detected recovering from overshooting.

17. A method for controlling a multiphase switching converter, wherein the multiphase switching converter having a plurality of switching circuits and an output terminal configured to provide an output voltage, and the method comprising:
   providing a comparison signal based on a reference signal and the output voltage;
   judging if the output voltage is overshooting based on the output voltage and an overshoot threshold;
   distributing the comparison signal to a plurality of set signals to turn ON the plurality of switching circuits successively; and
   turning OFF a current switching circuit when an ON-time period of the current switching circuit achieves a predetermined value; wherein
   when the output voltage is judged overshooting, the current switching circuit is turned OFF temporarily, and when the output voltage is judged recovering from overshooting, the current switching circuit is turned ON again for a first time period.

18. The method of claim 17, wherein a sum of the first time period and a second time period equals the predetermined value, wherein the second time period is a time period that the current switching circuit maintains ON before the output voltage is judged overshooting.

19. The method of claim 17, further comprising:
   providing an overshoot indicating signal via comparing the output voltage with the overshoot threshold; and
   judging if the output voltage is overshooting and providing an overshoot control signal based on the overshoot indicating signal; wherein when the overshoot control signal becomes a first state to indicate that the output voltage recovers from overshooting, the overshoot indicating signal is shielded and the overshoot control signal maintains at the first state during a predetermined time period.

20. The method of claim 17, further comprising:

triggering a timing circuit to start timing and turning ON the current switching circuit by a set signal; and stopping timing and turning OFF the current switching circuit when a time period timed by the timing circuit equals a predetermined value; wherein when the output voltage is detected overshooting, the timing circuit pauses and the current switching circuit is turned OFF temporarily; and wherein when the output voltage is detected recovering from overshooting, the timing circuit continues and the current switching circuit is turned ON again.

* * * * *